(12) United States Patent
Narimatsu et al.

(10) Patent No.: US 6,587,279 B2
(45) Date of Patent: Jul. 1, 2003

(54) PROJECTION ZOOM LENS SYSTEM AND PROJECTOR (75) Inventors: Shuji Narimatsu, Suwa (JP); Akira Sawamoto, Suwa (JP)

(73) Assignee: Nittoh Kogaku K.K. (JP)

(*) Notice: Subject to any disclaimer, the term of this patent is extended or adjusted under 35 U.S.C. 154(b) by 100 days.

(21) Appl. No.: 09/843,619

(22) Filed: Apr. 26, 2001

(65) Prior Publication Data

US 2002/0018301 A1 Feb. 14, 2002

(30) Foreign Application Priority Data

Apr. 27, 2000 (JP) .................................. 2000-127430

(51) Int. Cl.[7] .............................................. G02B 15/14
(52) U.S. Cl. ........................................ 359/683; 359/663
(58) Field of Search ................................. 359/663, 683

(56) References Cited

U.S. PATENT DOCUMENTS 5,841,587 A * 11/1998 Moskovich .................. 359/662
5,900,987 A * 5/1999 Kreitzer ...................... 359/649

* cited by examiner

*Primary Examiner*—Scott J. Sugarman
(74) *Attorney, Agent, or Firm*—Thompson Hine LLP (57) ABSTRACT A projection zoom lens system according to the present invention has a substantially telecentric incidence side and comprises a plurality of lens groups for behaving differently between a wide-angle end and a telephoto end, wherein at least one of two surfaces of a lens included in a first lens group located closest to a screen side has an aspheric surface. Since the lens closest to the screen has the largest diameter and the density of light rays becomes smallest among the lenses, it is possible to design the aspheric surface for correcting properly the light rays and reduce the correcting loads of the other lens groups constituting the projection zoom lens system so as to provide the compact and high performance zoom lens system.

9 Claims, 11 Drawing Sheets

PROJECTION ZOOM LENS SYSTEM AND PROJECTOR

BACKGROUND OF THE INVENTION

1. Technical Field

The present invention relates to a projection zoom lens system for a projector for projecting a magnified image displayed on a light valve onto a screen.

2. Description of the Related Art

Figure 11:
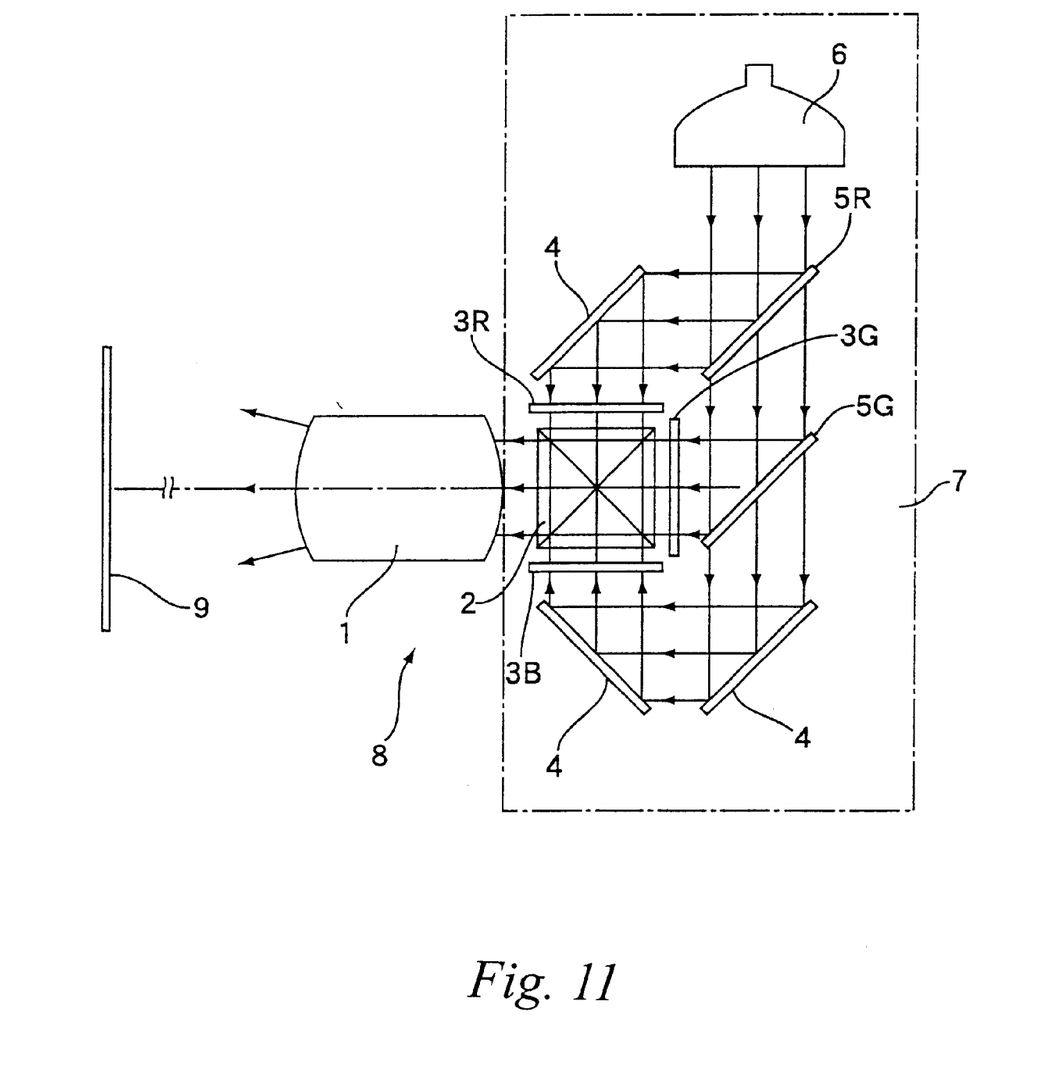
FIG. 11 shows a schematic configuration of a three-plate type projector.

FIG. 11 shows a schematic structure of a typical three-plate type liquid crystal (LCD) projector. A projector apparatus 8 for projecting a magnified image onto a screen includes a projection zoom lens system 1 for projecting an image supplied from incident side onto the screen, and an image forming apparatus 7 for supplying the image to the projection zoom lens system 1. In the LCD projector, LCD 3 acts as a light valve of the image forming apparatus 7. The projector 8 shown in FIG. 11 includes a white light source 6, dichroic mirrors 5R and 5G and mirror 4 for color-separating the light from the light source 6, liquid crystal panels (LCD) 3R, 3G and 3B. These LCD's are light through type display medium (light valve) and images of each color, namely red, green and blue are generated respectively. Images formed by these LCD's 3R, 3G and 3B are introduced into a dichroic prism 2 and color-compounded then led to the incidence side of the projection lens system 1. Accordingly, images displayed on the LCD light valves 3B, 3G and 3R are magnified, compounded and projected onto a screen 9.

The projection zoom lens system in such a LCD projector must have a long back focus for inserting the dichroic prism 2. Since the characteristics of dichroic prism largely depends on an incident angle due to its spectral characteristics, the liquid crystal panel side, the incidence side, of the projection zoom lens system 1 has to be telecentric. Further, not only in the above three-plate type image-forming apparatus, but also in any image-forming apparatus using LCD light valve, it is preferable to apply the projection lens system having the telecentric incidence side. Because the visual angle of the liquid crystal panel is relatively small, the image quality depends highly on the angle.

Recently, in place of the liquid crystal panels, the image forming apparatus including a device having a plurality of elements for forming pixels by mechanically changing reflecting direction of light using micro-electro-mechanical systems have been brought into practical use. One of such apparatus is a DMD (digital mirror device, deformation micro-foil device or display) in which fine mirrors (micro mirrors) are arranged into an array in correspondence with pixels for displaying image by controlling angle of each mirrors. An image forming apparatus including the micro mirrors for forming pixels provides faster response speed and brighter and higher contrast image than those of LCD. Therefore, it is suitable for providing a compact projector of high-intensity and high-quality image.

Further size down of the projector is required for carrying it with a mobile computer. For this purpose, in addition to miniaturize of the panel of light valve, it is essential to miniaturize an optical system such as the projection lens system. However, in the three-plate type projector, since the dichroic prism is disposed between the light valves, such LCD's or DMD's, and the projection lens system, the lens system having a long back focus is required. Accordingly, the length of the projection lens system becomes long, which prevents the entire optical system from being made compact.

Moreover, the projection lens system having a large field angle is required for projecting a large image onto the screen. Therefore, large-diameter lens is adopted especially as a lens located closest to the screen. This requirement also conflicts with the miniaturization of the optical system of the projector. Moreover, in order to satisfy the all of requirements that enlarging the lens diameter, improving aberration performance and increasing the relative illumination, it is necessary to constitute the projection lens system with a plenty of lenses. However, use of a large number of lenses introduces many drawbacks such as decreasing of the transmittance of the projection lens as a whole, increasing of the weight and increasing of the cost.

Accordingly, it is an object of the present invention to provide a compact zoom lens system with a simplified lens configuration having high transmittance, high performance and being low-cost while a sufficient back focus required for the projector is secured.

SUMMARY OF THE INVENTION

A projection zoom lens system of this invention that has a substantially telecentric incidence side comprises a plurality of lens groups for behaving differently between a wide-angle end and a telephoto end and at least one of two surfaces of a lens included in a first lens group located closest to a screen side has an aspheric surface for simplifying configuration and for realizing a compact and high-performance zoom lens system.

An aspheric lens has been adopted for improving the aberration performance. However, in order to suppress cost increase due to adopting the aspheric lens, the smallest lens located at an intermediate position or a smallest lens located closest to the light valve (incident side) among the lenses constituting the projection lens has been aspheric. On the contrary, in the projection zoom lens system according to the present invention, at least either of surfaces of the lens being located closest to the screen side and having a largest diameter is aspheric.

Since the lens located closest to the screen has a large diameter, the density of light rays for projection becomes minimum among the lenses of the projection zoom lens system. Therefore, by the surface of the lens located closest to the screen, it becomes possible to define the aspheric surface for more properly correcting respective light rays passing through the lens. Therefore, the lens of the first lens group located closest to the screen side having the aspheric surface achieves fine correction and reduces loads of correction of the other lens and/or lens groups of the projection zoom lens system. Accordingly, the number of the lenses constituting other lens group is reduced and the lens configuration of the present projection zoom lens system becomes further simplified.

In addition, since the lens configuration of the projection zoom lens system becomes simple by adopting the present invention, the overall length of the projection zoom lens system becomes shorter. When the length of projection zoom lens system becomes shorter, the diameter of the lens located closest to the screen, which has the largest diameter among the lens system, becomes smaller and minimizes the cost for making the lens having aspheric surface. Therefore, the present invention provides the projection zoom lens system being compact in both length and diameter and having fine correction performance.

Moreover, since the adoption of the aspheric lens in the first lens group corrects the aberration excellently, it becomes possible to arrange the first lens group by the single lens having aspheric surface. As mentioned above, the diameter of the first lens group is large and the cost thereof is high. Therefore, adopting the present invention minimizes the number of larger lenses for the lens system and reduces the overall cost for supplying the lens system. Reducing the number of larger diameter lenses which may requires larger space or length than the smaller diameter lenses, also shortens the overall length of the projection zoom lens system. In addition, the reduction of the number of the lenses increases the transmittance of the projection zoom lens system, and hence it is possible to provide a brighter zoom lens system.

It is preferable that the lens located closest to the screen among the first lens group is a meniscus lens being convex toward the screen side and having a negative refractive power. By arranging the negative meniscus lens at the closest to the screen side, a wide field angle and sufficient relative illumination are secured by the small lens. Therefore, the cost increase of the aspheric surface is further minimized and the diameters of other lens groups following the first lens group become reduced. Consequently, the entire projection zoom lens system that becomes further compact and thin and projects a bright and high-resolution image is provided at a low cost.

The one of the projection zoom lens systems according to the present invention comprises of five lens groups that are negative-positive-positive-negative-positive lens groups, sequentially in this order from the screen side (magnification side) to the incident side (reduction side). That is, the projection zoom lens system comprises the first lens group having a negative refractive power, a second lens group having a positive refractive power, a third lens group having a positive refractive power, a fourth lens group having a negative refractive power and a fifth lens group having a positive refractive power, arranged in this order from the screen side. In this lens system, zooming is carried out by fixing the first and fifth lens groups and moving the second, third and fourth lens groups. The above lens system has the arrangement of the refractive powers for forming basically a retro-focus type, so that an extremely long back focus is secured and it is possible to provide the projection lens system having the incident side being telecentric or very close to that state. Further, since the first lens group has the negative power, the lens system becomes a bright and wide-angle viewing projection zoom lens with the small F-number and the wide field angle. Moreover, by implementing the second and third lens groups so as to move independently, the small-size projection zoom lens system with excellent aberration correction performance is realized.

In the present invention, since the lens located closest to the screen side has the aspheric surface as described above, the aberration correction performance becomes improved. Therefore, the simple lens arrangement of nine to ten lenses in total realizes the projection zoom lens system with excellent aberration correction performance consisting of the five lens groups. Further, the reduction of the number of the lenses improves the transmittance and the total length of the projection zoom lens system as previously explained. Moreover, the projection zoom lens system with the five lens groups constituted less number of lenses makes lightweight and low cost lens system having great imaging or focusing performance.

Therefore, by combining the projection zoom lens according to the present invention with an image forming apparatus for supplying an image for projection to the incident side of this projection zoom lens, a projector being compact, suitable for carrying and capable of projecting a bright and sharp image onto the screen is provided.

In this invention, while the zoom ratio is approximately 1.2 times, it is possible to provide a compact but relatively larger diameter projection zoom lens with an F-number of approximately 2.

In the projection zoom lens system according to the present invention, in order to provide more compact zoom lens system that excels in the correction of aberrations, it is preferable that a composite or synthetic focal length $fw12$ of the first and second lens groups at the wide-angle end and a synthetic focal length $fw$ of the projection zoom lens system at the wide-angle end satisfy the following condition (A).

$$3 < fw12/fw \tag{A}$$

When the focal length $fw12$ of the first and second lens groups falls below the lower limit, the powers of the first and second lens groups are too strong and hence the distortion, especially distortion at the wide-angle end is not corrected sufficiently.

Further, it is preferable that the overall length L of the projection zoom lens and the focal length $f2$ of the second lens group satisfy the following condition (B).

$$1.4 < L/f2 < 1.8 \tag{B}$$

The focal length $f2$ of the second lens group that is one of the major variable power groups mainly determines the lens length of the entire projection zoom lens system. When the ratio ($L/f2$) falls below the lower limit of the condition (B), the overall length of the zoom lens system becomes shorter but it becomes difficult to suppress the coma aberration. On the other hand, when the ratio ($L/f2$) exceeds the upper limit of the condition (B), the coma aberration becomes extremely small but the lens length of the zoom lens system becomes longer, and hence the miniaturization becomes difficult.

Further, it is important for the focal length $f1$ of the first lens group and the focal length $f2$ of the second lens group to satisfy the following condition (C).

$$0.8 < |f1/f2| < 1.3 \tag{C}$$

When the absolute ratio $|f1/f2|$ exceeds the upper limit of the condition (C), the back focus Bf becomes too short and the zoom lens system becomes unsuitable as the projection lens (lens for projection). On the other hand, when the ratio $|f1/f2|$ falls below the lower limit of the condition (c), the back focus Bf becomes longer but it becomes difficult to suppress the occurrence of the coma aberration.

BRIEF DESCRIPTION OF THE DRAWINGS

The aforementioned and other objects and advantages of the present invention will become apparent to those skilled in the art upon reading and understanding the following detailed description with reference to the accompanying drawings.

In the drawings.

DESCRIPTION OF THE PREFERRED EMBODIMENTS

Embodiment 1

Figure 1:
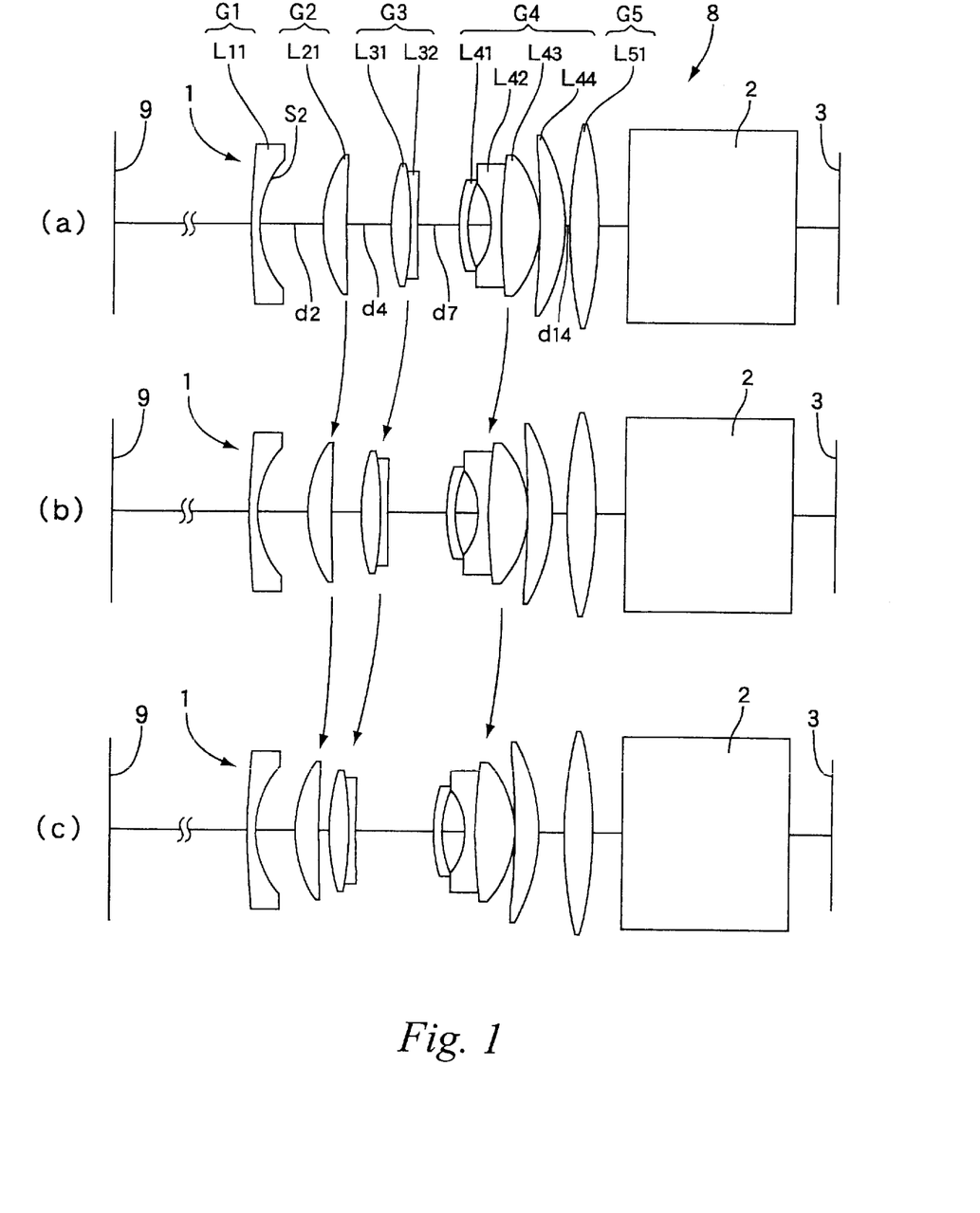
FIG. 1 shows a configuration of a projection zoom lens system of a projector according to Embodiment 1 of the present invention, illustrating arrangements at the wide-angle end (a), the telescopic end (c) and the intermediate (b)

FIG. 1 shows an optical system of a projector that includes a projection zoom lens system (a projector zoom lens) 1 according to a first embodiment of the present invention. The entire structure of the projector 8 was previously explained referring to FIG. 11. Images of each color formed by LCD's 3 are compounded by a dichroic prism 2. The color image is led to the projection zoom lens system 1 and projected onto a screen 9.

FIG. 1 shows locations of the respective lenses in the states of the projection zoom lens system 1. FIG. 1(*a*) shows positions of lenses at a wide-angle end corresponding to the state for magnifying and displaying. FIG. 1(*c*) shows a telephoto end corresponding to a standard state. FIG. 1(*b*) shows the medium or intermediate state between the former two states. The projection zoom lens system 1 of the present embodiment consists of nine (9) lenses L11 to L51 which are divided into five lens groups G1, G2, G3, G4 and G5. Details of each lens are listed below.

The zoom lens system 1 performs the zooming from the wide-angle end to the telephoto end by changing a distance d2 between the first and second lens groups, a distance d4 between the second and third lens groups, a distance d7 between the third and fourth lens groups, and a distance d14 between the fourth and fifth lens groups.

The first lens group G1 located closest to the screen 9 is a lens group having a negative power and composed of a negative refractive power meniscus lens L11 that is convex toward the screen 9 (screen side). Further, an incident side surface of this lens L11, namely a surface S2 facing the dichroic prism 2, is formed with an aspheric surface.

The second lens group G2 is a lens group that moves during zooming and composed of a convex lens L21 having a positive refractive power. The third lens group G3 is also a lens group that moves during zooming and that has a positive refractive power as a whole. The third lens group G3 is consist of, sequentially from the screen side, a positive biconvex lens L31 and a negative meniscus lens L32 that is convex toward the incident side, wherein these lenses L31 and L32 are combined to form a doublet (balsam).

The fourth lens group G4 is a lens group that moves during zooming and that has a negative refractive power as a whole. The fourth lens group G4 is composed of, sequentially from the screen side, a negative meniscus lens L41 that is convex toward the screen side, a negative by-concave lens L42, a by-convex positive lens L43 forming a doublet together with the lens L42, and a positive meniscus lens L44 that is convex toward the prism 2 (incident side) The final lens group G5 located closest to the prism 2 is a lens group having a positive refractive power and consists of a convex lens L51.

As explained previously, the lens system 1 has the configuration consisting of the five lens groups, namely negative-positive-positive-negative-positive lens groups, being a combined arrangement of the retro focuses. By this lens configuration, the incident side of the lens system 1 becomes easily telecentric or almost telecentric having an exceedingly long back focus.

Further, in this lens system 1, zooming is possible by behaving each of these lens groups G1 to G5 differently. In this embodiment, during zooming, the first lens group G1 and the fifth lens group G5 are fixed, and the second lens group G2, the third lens group G3 and the fourth lens group G4 are moved. More specifically, in this embodiment, the second lens group G2, the third lens group G3 and the fourth lens group G4 are all moved to the same direction toward the side of the screen 9 from the wide-angle end to the telephoto end for zooming.

In the projection zoom lens system 1 of this embodiment, the front or forward lens L11 located closest to the screen 9 (screen side) for focusing is the single and screen side convex negative meniscus lens and its incident side surface S2 is aspheric. First, the aspheric surface of the lens L11 corrects the aberration excellently. Especially, since the lens L11 is located closest to the screen, the lens L11 has the largest diameter and surface among the lenses constituting of the zoom lens system 1, therefore the density of light rays passing through the lens L11 becomes lowest among the lenses. Accordingly, it is easy to design the aspheric surface for correcting aberration properly taking each condition of light rays or beams passing through the lens into account. Therefore, the aberration is well corrected in an excellent manner. Owing to this excellent correction, the first lens group can be consisted of the single lens. As mentioned, diameter of the first lens group G1 is the largest, hence the single element configuration curtails manufacturing cost of lens system 1 to a large degree.

A lens having a smaller or the smallest diameter has been selected for aspheric lens for improving the corrective performance of the aberration for reducing the manufacturing cost. On the contrary, in this invention, the lens having a larger or the largest diameter is selected for aspheric lens to achieve drastic improvement in the aberration correction performance. Although the cost of the aspheric lens itself increases, the number of the lenses that constitute the first lens group G1 can be reduced, and in addition, as described thereinafter, the number of the lenses that constitute the other lens groups can also be reduced. Therefore, the design of lens configuration of the present invention has a lot of merit including the manufacturing cost. Thus, the zoom lens system 1 according to the present invention is based on the idea adopting the aspheric surface on a lens having a large diameter. In addition, using the merits of the lens system having aspheric surface on such the large lens fully and efficiently, there has been realized the zoom lens whose aberration is corrected excellently and that is exceedingly compact as described herein.

Making the first lens group G1 with one lens has a lot of merit besides the cost. In a lens having a larger diameter, the larger the radius of curvature thereof is, the larger the undesirable effect on the overall length of the lens becomes. However, the zoom lens system 1 of this embodiment having the single large-diameter lens as the first lens group G1 has an effect of reducing the overall length. Further, the reduced number of the lenses improves the transmittance of the lens system 1 for obtaining the brighter zoom lens system.

In addition, the aspheric lens L11 is negative meniscus lens that is convex toward the screen side. This type of lens secures, with not so large diameter, a large field angle and sufficient relative illumination. Consequently, this lens system 1 is exceedingly thin or narrow as a projection zoom lens and becomes a bright with a small F-number and wide-angle zoom lens. As explained, in this lens system 1, by the largest diameter being aspheric, the diameter of the lens system 1 is reduced, hence more cost-effective and more compact zoom lens system is provided.

Thus, the improvement of the aberration correction performance by the aspheric lens L11 of the first lens group G1 influences other lens groups as well as the first lens group. Namely, since the lens L11 for focusing corrects the aberration in an excellent manner and decrease correction loads of the other the lens groups, the zoom lens is simplified and has, in this embodiment, the second lens group G2 consisting of the single lens, the third lens group G3 consisting of two lenses and the fifth lens group G5 consisting of the single lens. Accordingly, while the lens system 1 consists of five lens group, it is implemented in a very simple configuration consisting of nine lenses in total.

The reduction of the number of the lenses brings not only economic advantages but also shortened overall length of the zoom lens system 1, and hence the zoom lens 1 becomes compact and also lightweight. The transmittance of the zoom lens system 1 is also improved, therefore, a bright, compact and lightweight zoom lens system that suits for a portable projector currently under extensive development is provided.

Further, to provide the zoom lens 1 consisting of the five lens groups according to this embodiment that is further compact and has much excellent aberration characteristics, the projection zoom lens system 1 of this embodiment is designed to satisfy the conditions (A), (B) and (C) described above.

In lens data shown below;
ri is the radius of curvature (mm) of each of the lenses arranged sequentially from the screen side;
di is the distance (mm) between the adjacent lens surfaces arranged sequentially from the screen side;
ni is the refractive rate (d line) of the lens arranged sequentially from the screen side;
vi is the Abbe number (d line) of the lens arranged sequentially from the screen side;
f is a resultant or synthesis focal length (mm) of the lens system 1;
fw is a resultant or synthesis focal length at the wide-angle end of the lens system 1;
f1 is a focal length of the first lens group G1;
f2 is a focal length of the second lens group G2;
fw12 is a resultant or synthesis focal length of first and second lens group at the wide-angle end;
L is an overall length of the zoom lens system 1;
Bfw is a back focus (mm) at the wide-angle end;
FNo is a F-number;
"inf" in the data represents a prism surface, and
ASP indicates an aspheric surface.

Lens Data (No.1)

| i | ri | di | ni | vi | note |
|---|---|---|---|---|---|
| 1: | 145.54 | 1.40 | 1.48749 | 70.4 | lens L11 |
| 2: | 16.18(ASP) | d2 | | | |
| 3: | 22.67 | 4.10 | 1.64769 | 33.8 | lens L21 |
| 4: | 240.05 | d4 | | | |
| 5: | 38.88 | 3.42 | 1.67003 | 47.2 | lens L31 |
| 6: | −54.53 | 1.20 | 1.84666 | 23.8 | lens L32 |
| 7: | 1271.34 | d7 | | | |
| 8: | 28.25 | 1.50 | 1.53172 | 48.8 | lens L41 |
| 9: | 19.20 | 4.00 | | | |
| 10: | −12.00 | 1.74 | 1.84666 | 23.8 | lens L42 |
| 11: | 88.16 | 6.90 | 1.49700 | 81.6 | lens L43 |
| 12: | −17.85 | 0.20 | | | |
| 13: | −143.17 | 4.47 | 1.83400 | 37.3 | lens L44 |
| 14: | −29.84 | d14 | | | |
| 15: | 76.62 | 5.04 | 1.83500 | 43.0 | lens L51 |
| 16: | −70.92 | 5.29 | | | |
| 17: | inf | 29.20 | 1.51680 | 64.2 | prism 2 |
| 18: | inf | | | | |

Variety of distances and other data at the wide-angle end, the medium and the telescopic end are as follows:

| | Wide angle | Medium | Telephoto |
|---|---|---|---|
| f | 28.0 | 30.76 | 33.6 |
| Fno | 2.0 | | 2.3 |
| d2 | 10.92 | 8.74 | 6.98 |
| d4 | 7.78 | 5.02 | 1.81 |
| d7 | 7.27 | 10.53 | 13.77 |
| d14 | 0.60 | 2.28 | 4.00 |

The distances indicated are values when imaging is achieved at a position of 2.4 m from the forward end of the lens system 1.

The surface 2 of the lens L11 is aspheric and its aspheric coefficients are as follows:

K=0.00000
A=−0.145800×10⁻⁴, B=−0.558070×10⁻⁷
C=0.615709×10⁻¹⁰, D=−0.119603×10⁻¹¹

Wherein the equation of the aspheric surface is follows:

$$x=(y^2/r)/[1+\{1-(1+K)(y^2/r^2)\}^{1/2}]+Ay^4+By^6+Cy^8+Dy^{10} \quad (3)$$

Various values of the projecting zoom lens system 1 of this embodiment are as follows:

| fw = | 28.0 | |
|---|---|---|
| f1 = | −37.36 | |
| f2 = | 38.13 | |
| fw12 = | 145.66 | |
| L = | 60.54 | |
| Bfw = | 31.99 | (in the air) |

Therefore, parameters defined in the above conditions (A), (B) and (C) are as follows:

| condition (A) fw12/fw = | 5.2 |
|---|---|
| condition (B) L/f2 = | 1.59 |
| condition (C) f1/f2 = | 0.98 |

In the projection zoom lens system 1 of this embodiment, the lens L11 closest to the screen has so small diameter approximately 30 mm and the overall length L is so short approximately 60 mm. Although being such a compact zoom lens, the magnification (zoom ratio) is 1.2 times and the F-number at the wide-angle end is approximately 2, resulting in a highly bright zoom lens. Further, as shown in FIG. 2 to FIG. 5, aberrations are corrected in an excellent manner, and hence the lens system 1 projects a bright, clear, and large image.

Figure 2:
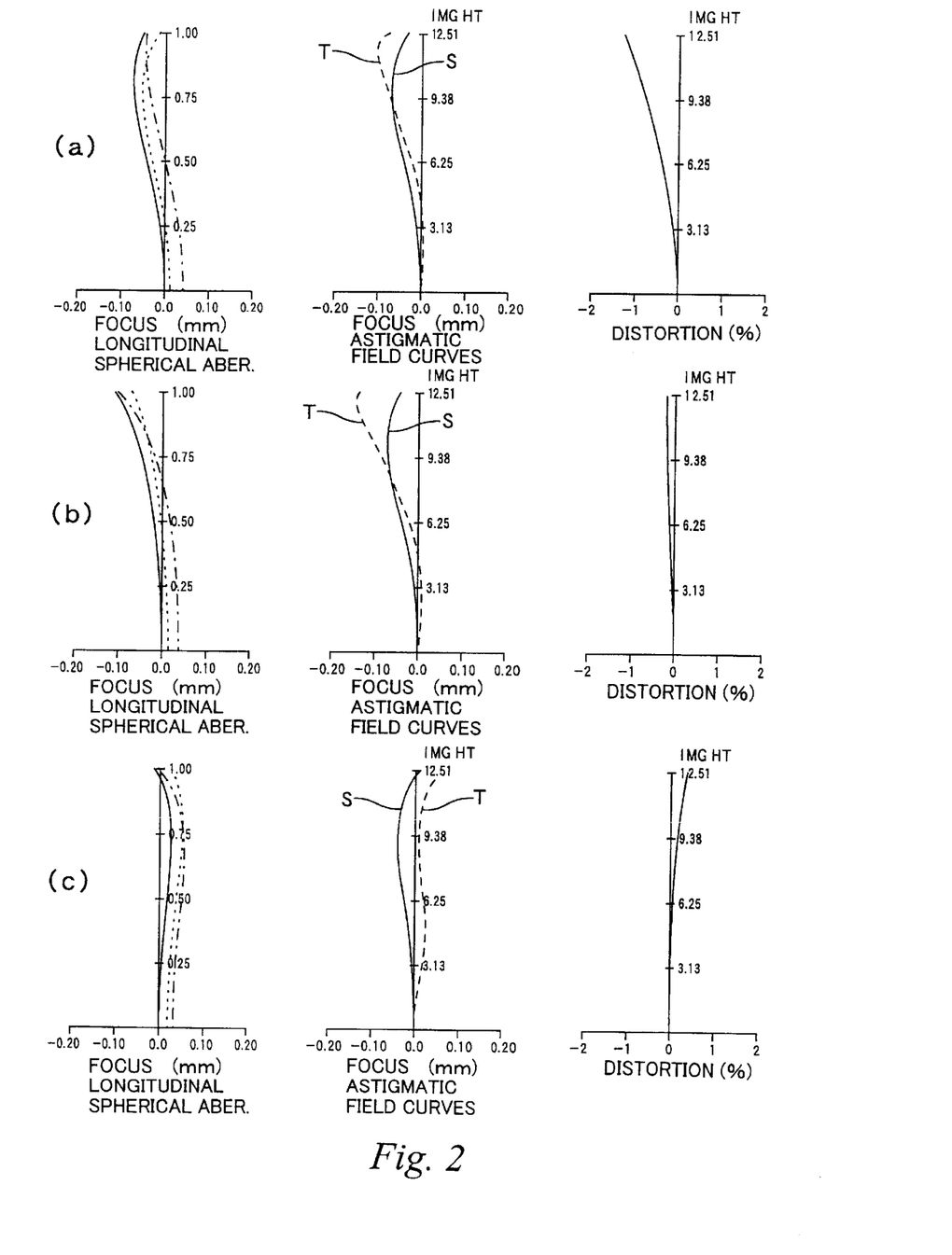
FIG. 2 shows vertical aberration at the wide-angle end (a), the telescopic end (c) and the intermediate (b) of the lens system of FIG. 1.
Figure 3:
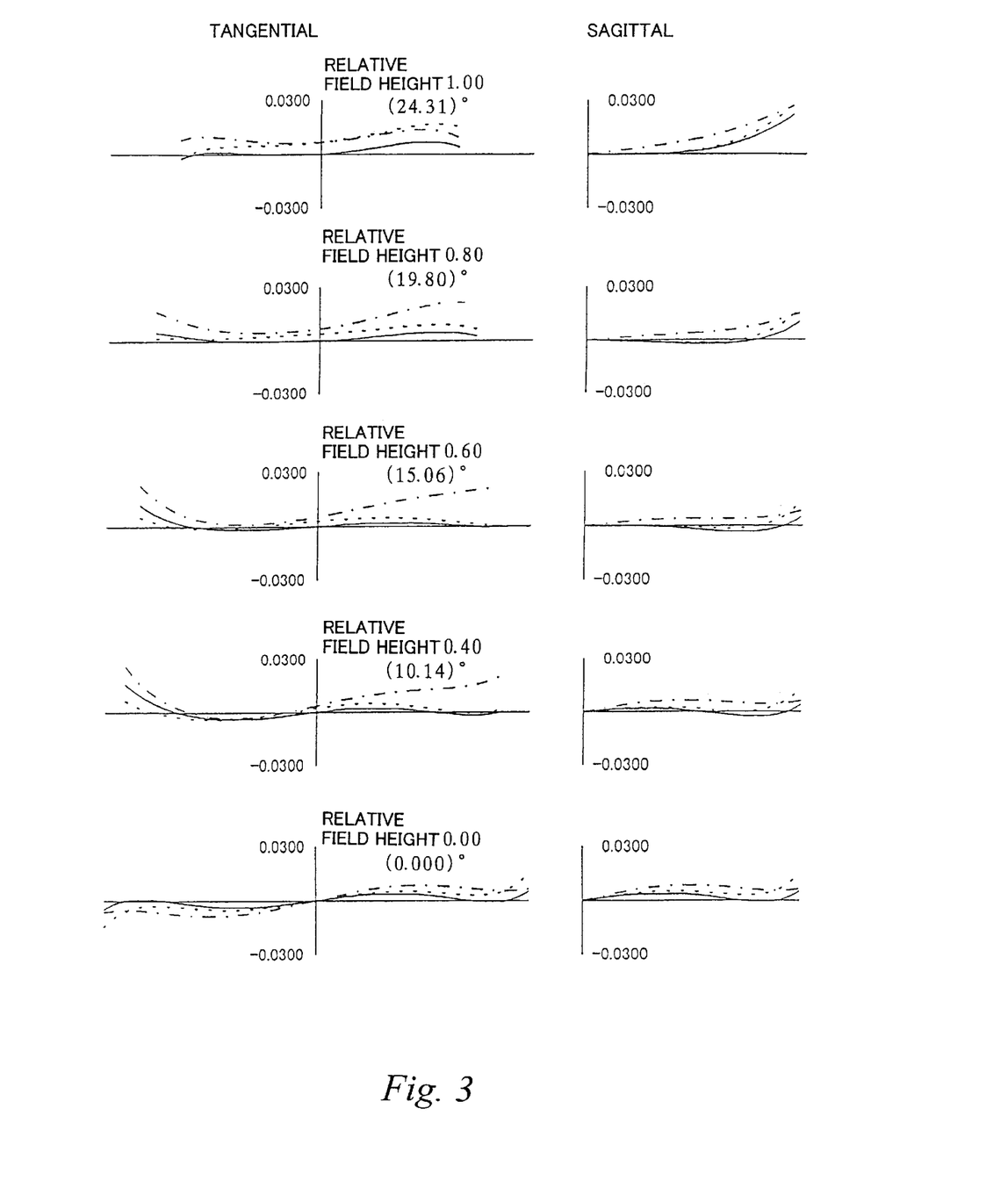
FIG. 3 shows lateral aberration of the lens system of FIG. 1 at the wide-angle end.
Figure 4:
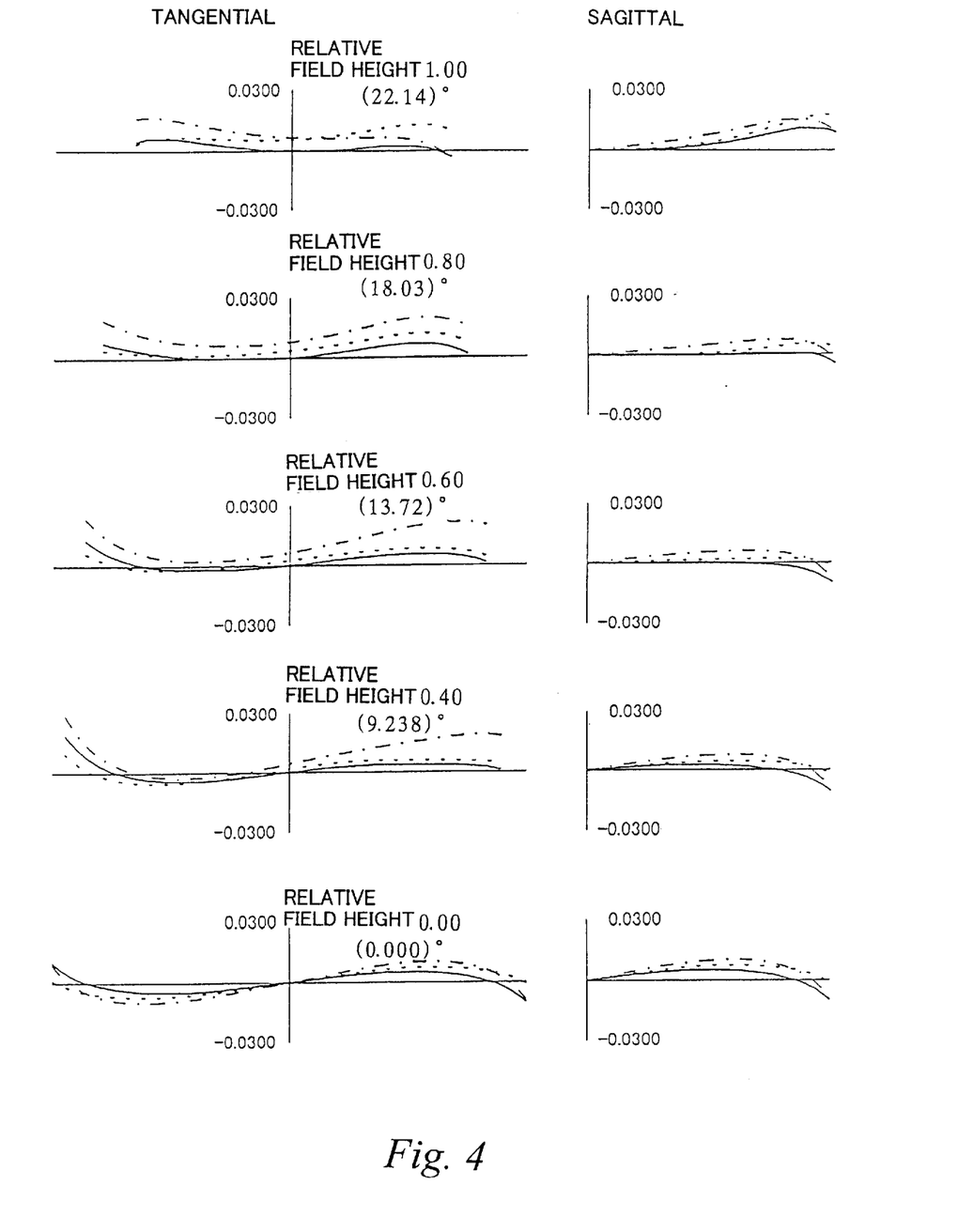
FIG. 4 shows lateral aberration of the lens system of FIG. 1 at the intermediate.
Figure 5:
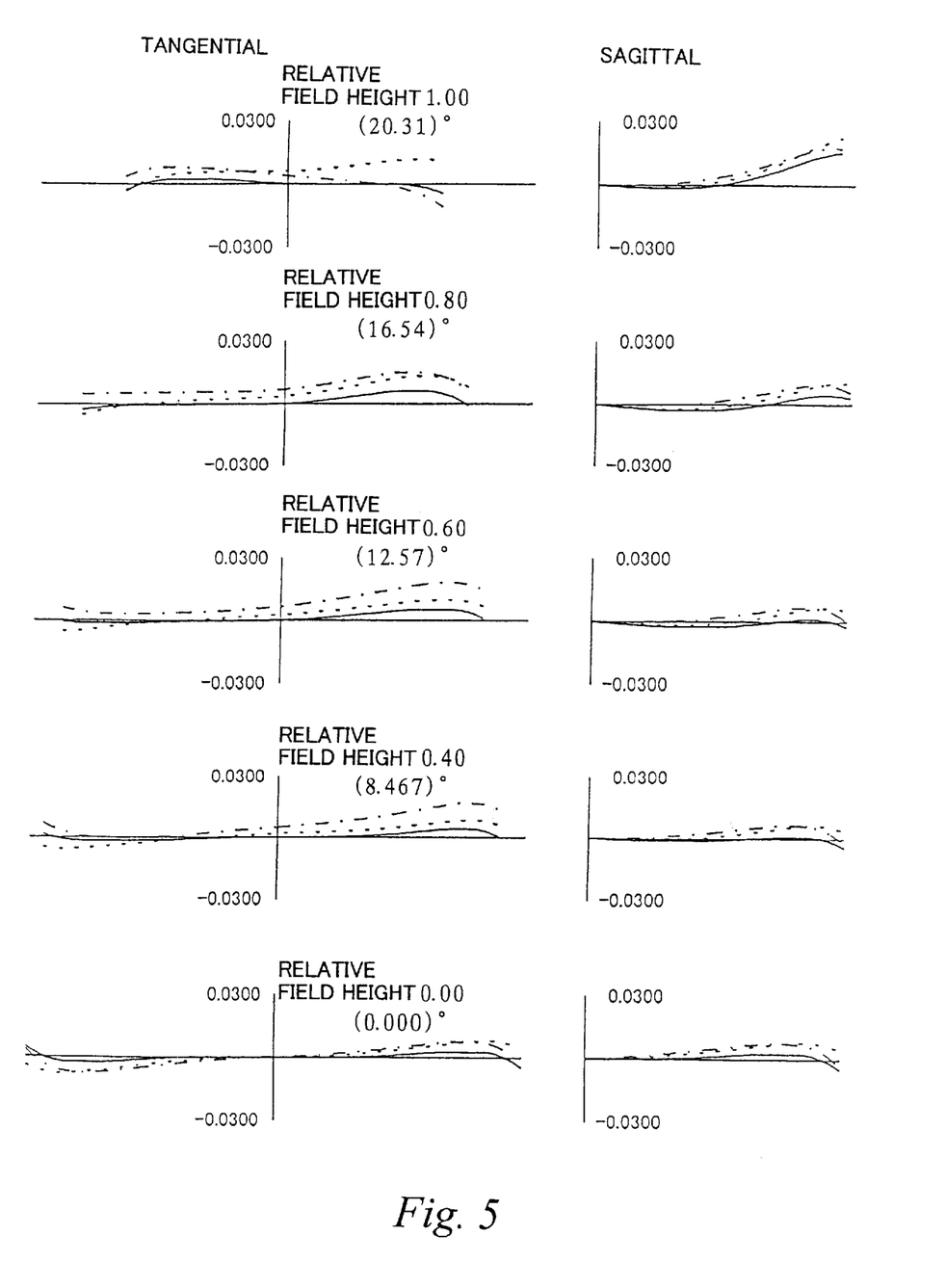
FIG. 5 shows lateral aberration of the lens system of FIG. 1 at the telescopic end.

FIG. 2 shows spherical aberration, astigmatic aberration and distortion at the wide-angle end (a), the telephoto end (c), and the medium (intermediate) position (b) of this projection zoom lens system 1. FIG. 3 to FIG. 5 show lateral spherical aberrations at the wide-angle end (FIG. 3), the telephoto end (FIG. 5) and the medium (FIG. 4). The spherical aberration is shown by the aberrations at wavelengths of 620.0 nm (broken line), 550.0 nm (solid line) and 470.0 nm (dot-dash line). The astigmatic aberration and the lateral aberration are shown by the aberrations for the tangential beam (represented by "T") and the sagittal beam ("S") respectively.

As shown in these diagrams, the vertical or longitudinal aberrations of the projection zoom lens system 1 of this embodiment are almost in a range of about ±0.1 mm for zoom setting from the wide-angle end to the telephoto end, and this aberration performance or correction of aberration is equal to or better than that of the conventional high-performance telecentric type projection zoom lens consisting of over ten several lenses. Therefore, it can be understood that the projection zoom lens system of this embodiment is exceedingly compact and its aberration performance is extremely excellent despite of a simple lens configuration consisting of nine lenses in total. Further, magnification chromatic aberration and distortion are in no way inferior to those of the conventional zoom lens having over ten several lenses, as is the case of the vertical aberration. Moreover, the lateral aberrations are almost in a range of about ±0.03 mm for zoom settings from the wide-angle end to the telephoto end. Therefore, the projection zoom lens system 1 of this embodiment is proved to be a high-performance projection zoom lens whose lateral aberration performance is also extremely excellent and that hardly exhibits flare (coma flare) due to the influence of the coma aberration.

In addition, the zoom lens system 1 of this embodiment satisfies balances of the powers of the lens groups of conditions (A), (B) and (C). Thereby, the aberrations are corrected excellently for a whole region of zooming. Further, this is the wide angle viewed and bright projection zoom lens having sufficiently long back focus Bfw and telecentric incident side.

Therefore, the projection zoom lens system 1 is suitable for a projector for forming a color image using LCD's or DMD's as light valves and also using a dichroic prism or a TIR prism or the like as an image compounding element. In addition, using the zoom lens system 1 makes it possible for this projector as a whole to be integrated in an exceedingly thin and compact form. Since the projection zoom lens system 1 has the telecentric incident side, its performance is less dependent on directions of light rays. Therefore, this projection zoom lens system 1 is also suitable for the other projector that comprises an image forming device for compounding or forming and supplying an image for projection by optical elements having an angular dependence like dichroic prism and other prisms, and such projector can be integrated into a portable size.

Embodiment 2

Figure 6:
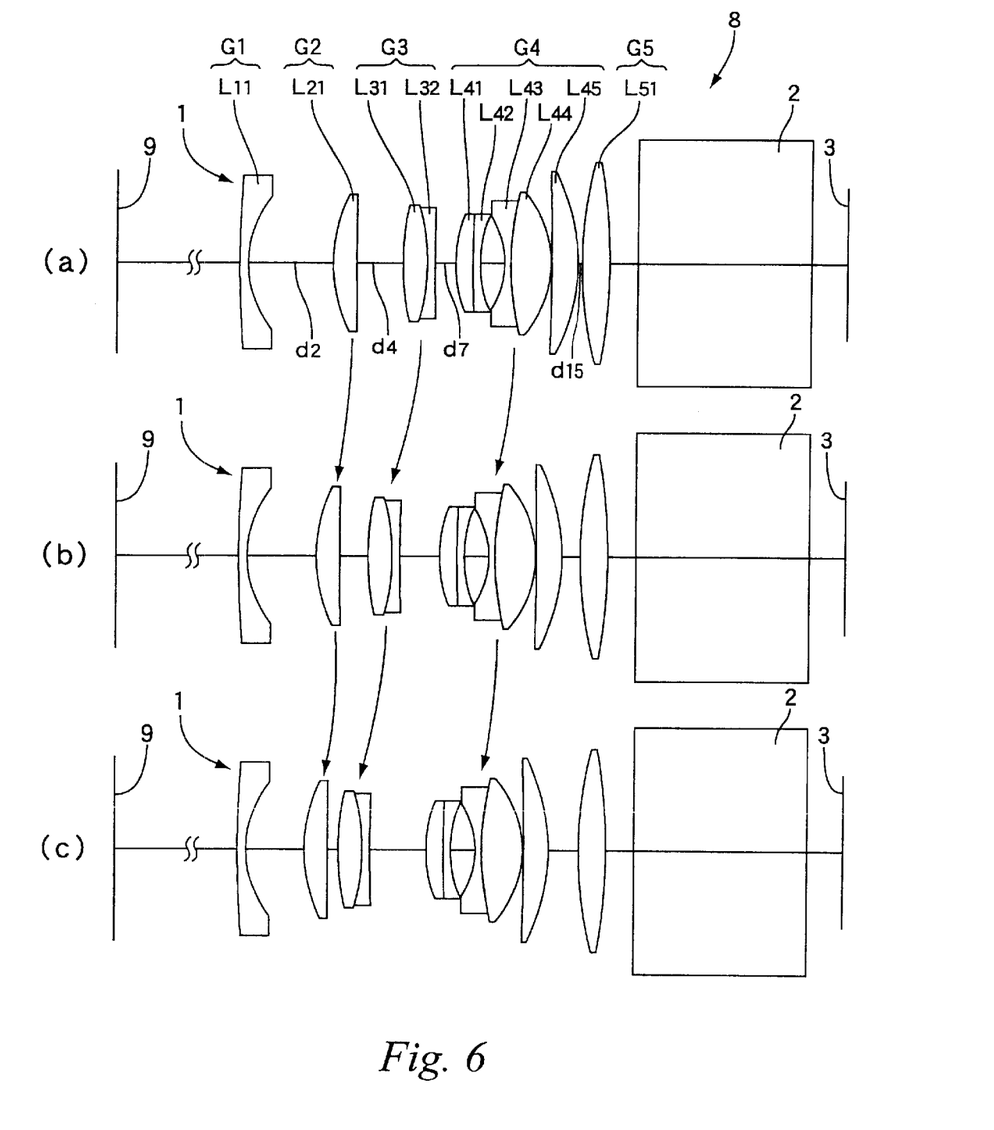
FIG. 6 shows a configuration of a projection zoom lens system of a projector according to Embodiment 2 of the present invention, illustrating arrangements at the wide-angle end (a), the telescopic end (c) and the intermediate (b)

FIG. 6 shows an optical system of a projector using the projection zoom lens system 1 according to a second embodiment of the present invention. FIG. 6 illustrates the arrangements of the lenses consisting the present zoom lens system, in the same manner as in FIG. 1, at the wide-angle end FIG. 6(a), the medium position FIG. 6(b) and the telephoto end FIG. 6(c) respectively. The projection zoom lens system 1 of this embodiment is composed of ten (10) lenses L11 to L51 which are divided into the five lens groups G1, G2, G3, G4 and G5, sequentially from the side of the screen 9. Lens data of each lens are as shown below. The configurations of the lens groups of the projection zoom lens system 1 of this embodiment are approximately the same as those of the above first embodiment, but a lens of the fourth lens group G4 that is located closest to the screen is replaced with a doublet. Therefore, the fourth lens group G4 is composed of five lens L41 to L45. Accordingly, the projection zoom lens system 1 of this embodiment consists of ten lenses in total.

The following lens data and various aberrations are shown by the same method as Embodiment 1.

| Lens Data (No.2) | | | | | |
|---|---|---|---|---|---|
| i | ri | di | ni | vi | note |
| 1: | 194.50 | 1.50 | 1.48749 | 70.4 | lens L11 |
| 2: | 17.32(ASP) | d2 | | | |
| 3: | 27.27 | 4.05 | 1.71736 | 29.5 | lens L21 |

-continued

| Lens Data (No.2) | | | | | |
|---|---|---|---|---|---|
| i | ri | di | ni | vi | note |
| 4: | 652.44 | d4 | | | |
| 5: | 46.75 | 4.20 | 1.72342 | 38.0 | lens L31 |
| 6: | −34.68 | 1.30 | 1.74077 | 27.8 | lens L32 |
| 7: | 200.04 | d7 | | | |
| 8: | 22.72 | 3.00 | 1.49700 | 81.6 | lens L41 |
| 9: | 172.92 | 1.30 | 1.74077 | 27.8 | lens L42 |
| 10: | 21.30 | 4.20 | | | |
| 11: | −14.19 | 1.20 | 1.84666 | 23.8 | lens L43 |
| 12: | 52.11 | 7.20 | 1.49700 | 81.6 | lens L44 |
| 13: | −18.36 | 0.20 | | | |
| 14: | −373.88 | 4.45 | 1.83500 | 43.0 | lens L45 |
| 15: | −34.22 | d15 | | | |
| 16: | 66.55 | 4.85 | 1.80518 | 25.5 | lens L51 |
| 17: | −101.05 | 5.00 | | | |
| 18: | inf | 30.00 | 1.51680 | 64.2 | prism 2 |
| 19: | inf | | | | |

Variety of distances and other data at the wide-angle end, the medium and the telescopic end are as follows:

| | Wide angle | Medium | Telephoto |
|---|---|---|---|
| f | 28.0 | 31.04 | 33.6 |
| Fno | 2.0 | | 2.3 |
| d2 | 14.83 | 12.12 | 10.23 |
| d4 | 8.02 | 4.86 | 1.81 |
| d7 | 3.69 | 7.05 | 9.88 |
| d15 | 0.80 | 3.30 | 5.42 |

The distances indicated are values when imaging is achieved at a position of 2.4 m from the forward end of the lens system 1.

The surface 2 of the lens L11 is aspheric and its aspheric coefficients are as follows:
K=0.00000
$A=-0.132099\times10^{-4}$, $B=-0.523408\times10^{-7}$
$C=0.118988\times10^{-9}$, $D=-0.911028\times10^{-12}$
The aspheric equation is the equation (3) above.
Various values of the projecting zoom lens system 1 of this embodiment are as follows:

| fw = | 28.0 | |
|---|---|---|
| f1 = | −38.99 | |
| f2 = | 39.28 | |
| fw12 = | 106.84 | |
| L = | 64.79 | |
| Bfw = | 30.89 | (in the air) |

Therefore, parameters defined in the above conditions (A), (B) and (C) are as follows:

| condition (A) fw12/fw = | 3.81 |
|---|---|
| condition (B) L/f2 = | 1.65 |
| condition (C) f1/f2 = | 0.99 |

In the projection zoom lens system 1 of this embodiment, the lens L11 located closest to the screen 9 has so small diameter approximately 30 mm and the overall length L of the zoom lens system 1 is so short approximately 65 mm. While the zoom lens system 1 is so compact, it has a magnification ratio (zoom ratio) of 1.2 times and an highly bright with an F-number of approximately 2 at the wide-angle end. Moreover, as shown in FIG. 7 to FIG. 10, the aberrations are corrected in an extremely excellent manner, so that the projection zoom lens system 1 of this embodiment can also project a bright, clear and large image onto the screen.

Figure 7:
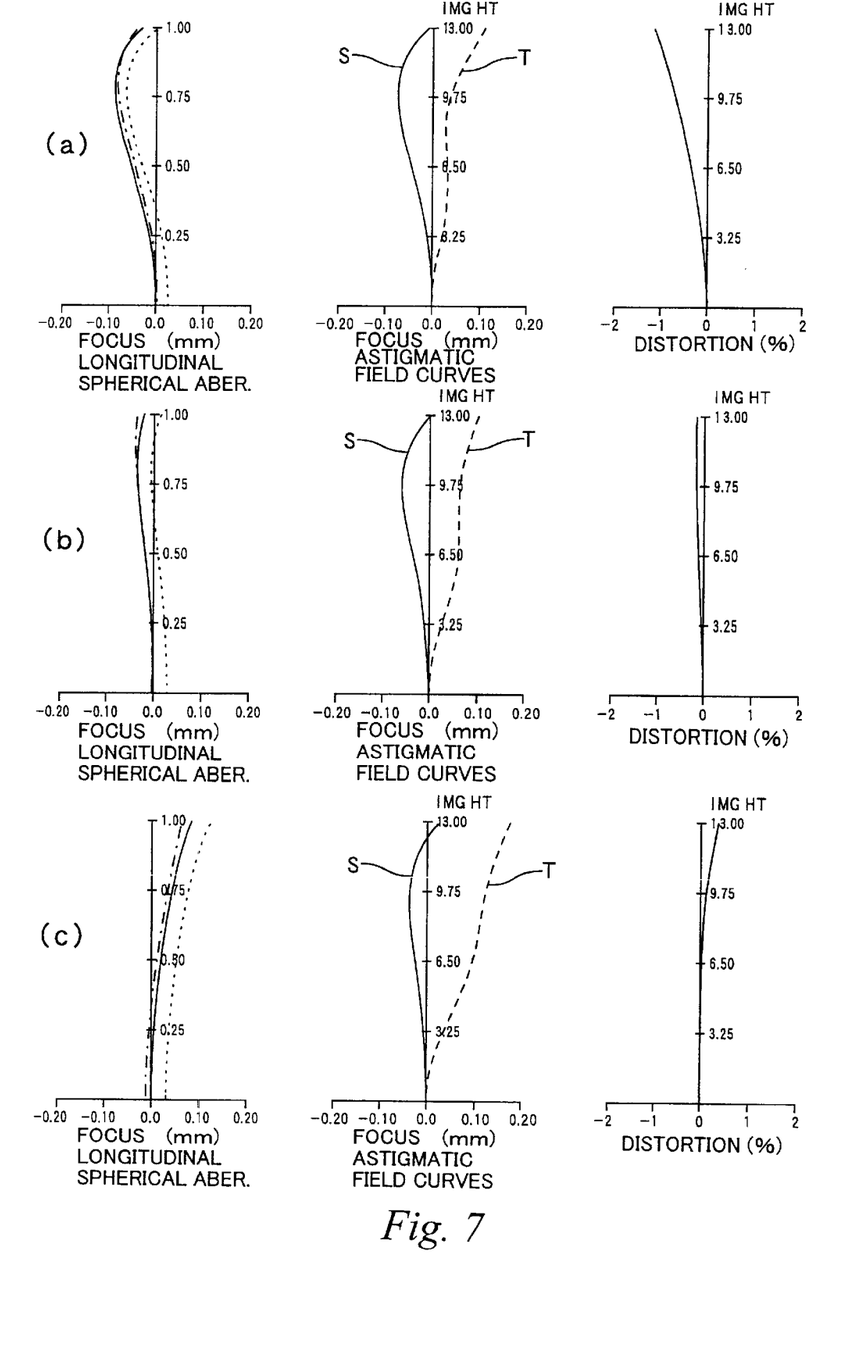
FIG. 7 shows vertical aberration at the wide-angle end (a), the telescopic end (c) and the intermediate (b) of the lens system of FIG. 6.
Figure 8:
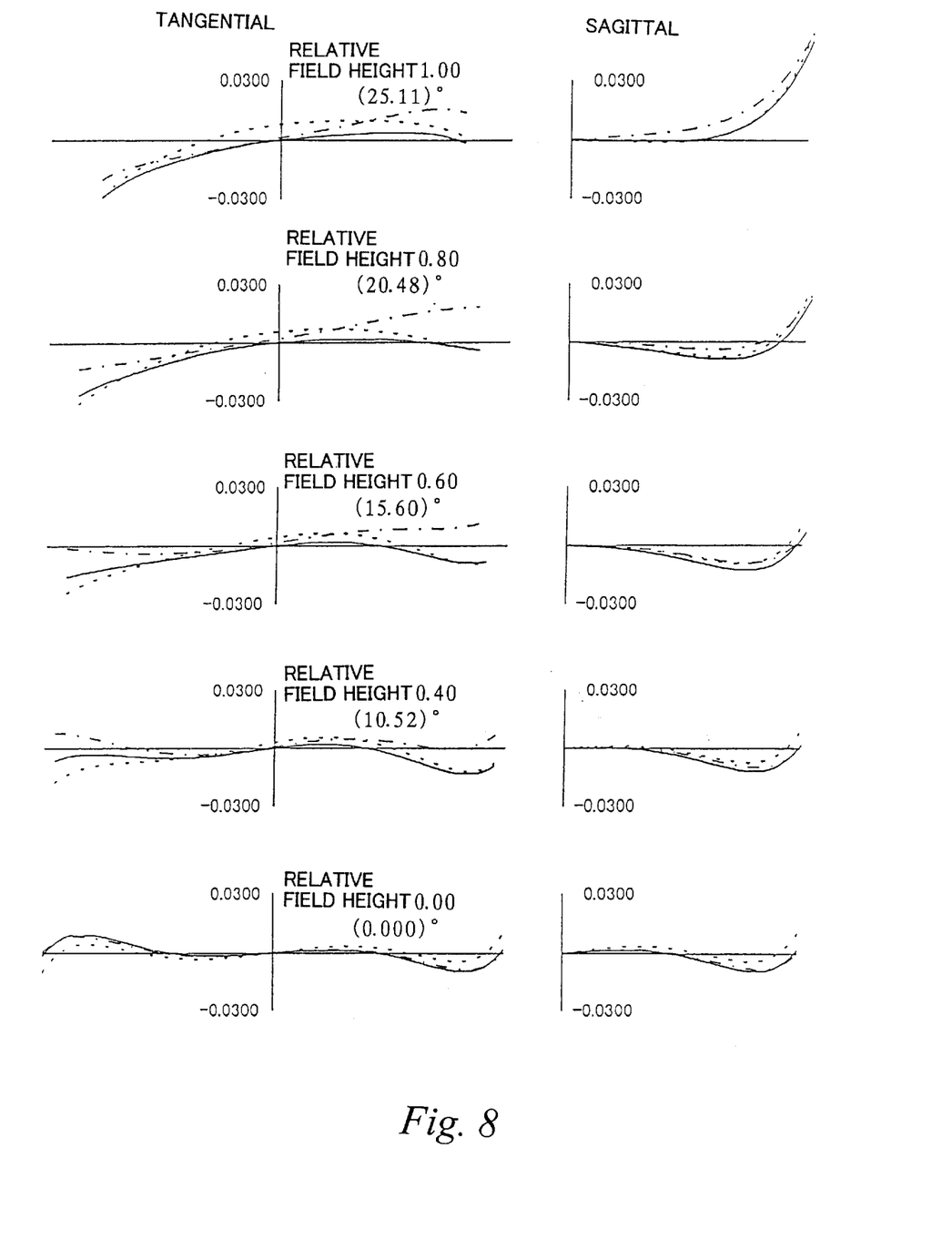
FIG. 8 shows lateral aberration of the lens system of FIG. 6 at the wide-angle end.
Figure 9:
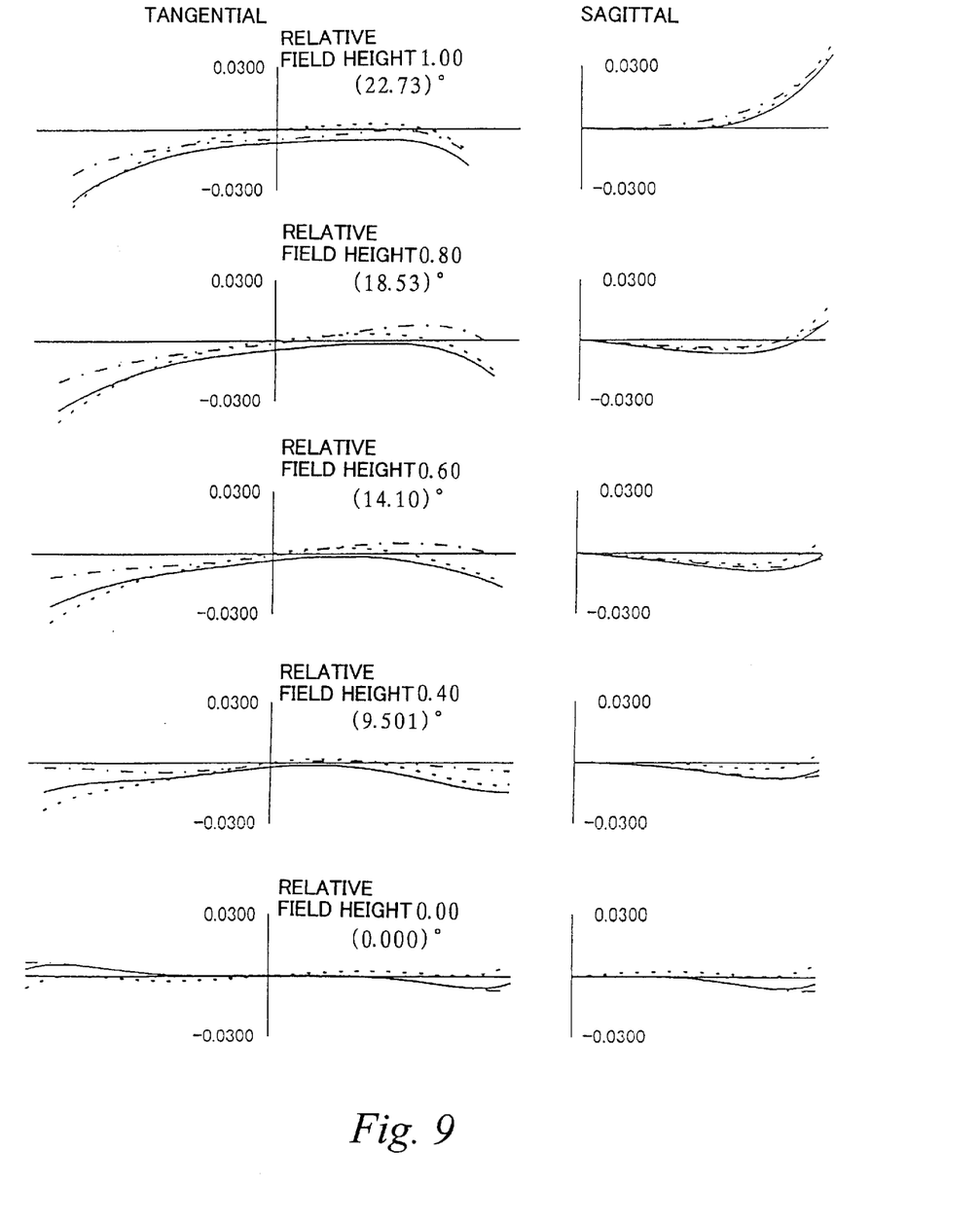
FIG. 9 shows lateral aberration of the lens system of FIG. 6 at the intermediate.
Figure 10:
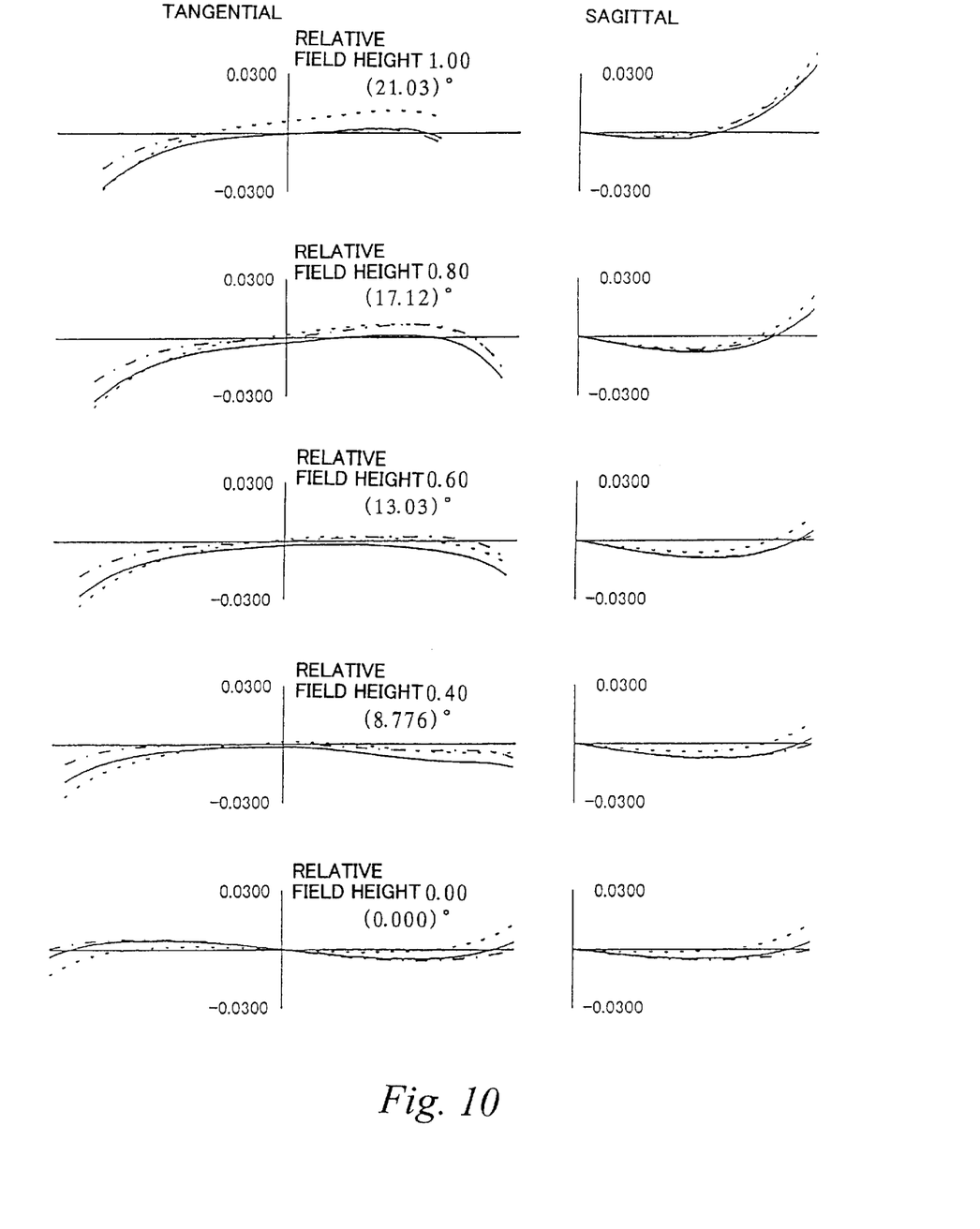
FIG. 10 shows lateral aberration of the lens system of FIG. 6 at the telescopic end.

FIG. 7 shows spherical aberration, astigmatic aberration and distortion of this projection zoom lens system at the wide-angle end (a), the telephoto end (c) and the medium position (b) respectively. Further, FIG. 8 to FIG. 10 show lateral spherical aberrations at the wide-angle end (FIG. 8), the telephoto end (FIG. 10), and the medium position (FIG. 9). As indicated in these figures, the vertical or longitudinal aberrations of the projection zoom lens system 1 of this embodiment are almost in a range of ±0.1 mm or less for zoom settings from the wide-angle end to the telephoto end, which proves this embodiment provides the zoom lens with better or higher aberration performance compared to the zoom lens system of embodiment 1. Moreover, the lateral aberrations are almost in a range of about ±0.02 mm for zoom settings from the wide-angle end to the telephoto end. Therefore, the lateral aberration performance is also extremely excellent, and the zoom lens system 1 of this embodiment is also a high-performance projection zoom lens that hardly exhibits flare (coma flare) due to the influence of the coma aberration.

As explained in these embodiments, the projection zoom lens systems of these embodiment consists of the five lens groups wherein the incident side surface of the lens L11 of the first lens group G1 located closest to the screen side is aspheric. Although the number of lenses constituting the system is as small as nine to ten, these incident side telecentric zoom lens systems have excellent aberration performance. Further, dimensions of the entire projection zoom lens systems are approximately 30 mm in diameter and about 60 to 65 mm in length, so that the zoom lens systems become exceedingly compact. In these embodiments, only the single face of the lens located closest to the screen has the aspheric surface. However, it is also possible to form aspheric surfaces on both surfaces of that lens. However, since forming the aspheric surface on one surface of that lens provides such a compact and high-performance zoom lens system, to provide sufficient performance lens system economically, it is better to form the aspheric surface on single surface of the lens. More specifically, it is better to form the aspheric surface on the incident side of the lens L11 because the incident side surface area is smaller than the screen side surface area in these embodiments.

As explained, in the projection zoom lens system of this invention, at least one surface of the focusing lens located closest to the screen is aspheric and has the function for correcting the aberrations efficiently with compact lens system having a small number of lenses. Especially, applying five lens groups as arranged in negative, positive, positive, negative and positive, sequentially from the screen side, the exceedingly compact input side telecentric zoom lens system whose dimensions are about 30 mm in diameter and about 60 to 65 mm in overall length and whose imaging performance is so excellent is provided. In addition, reduction of the number of the lenses consisting the lens system provides the cost-effective, compact and bright projection zoom lens system with a reduced weight and higher transmittance. Moreover, in the projection zoom lens of this invention, sufficiently large field angle and relative illumination are secured.

Therefore, the compact and high performance projection zoom lens of this invention is suitable for providing the small and practically portable projector capable of projecting a bright and high-resolution image.

While this invention has been particularly shown and described with references to preferred embodiments thereof, it will be understood by those skilled in the art that various changes in form and details may be made therein without departing from the spirit and scope of the invention as defined by the appended claims.

What is claimed is:

1. A projection zoom lens system having a substantially telecentric incidence side, comprising a plurality of lens groups for behaving differently between a wide-angle end and a telephoto end, wherein at least one of two surfaces of a lens included in a first lens group located closest to a screen side has an aspheric surface, and wherein the plurality of lens groups are the first lens group having a negative refractive power, a second lens group having a positive refractive power, a third lens group having a positive refractive power, a fourth lens group having a negative refractive power and a fifth lens group having a positive refractive power, arranged in this order from the screen side, whereby zooming is carried out by fixing the first and fifth lens groups and moving the second, third and fourth lens groups.

2. A projection zoom lens system according to claim 1, wherein the lens having the aspheric surface constitutes said first lens group.

3. A projection zoom lens system according to claim 1, wherein the first lens group includes a meniscus lens located closest to the screen side that is convex toward the screen side and has a negative refractive power.

4. A projection zoom lens system according to claim 3, wherein the meniscus lens has the aspheric surface.

5. A projection zoom lens system according to claim 3, wherein the incidence side of the meniscus lens has the aspheric surface.

6. A projection zoom lens system according to claim 1, wherein a focal length fw12 of the first and second lens groups at the wide-angle end and a focal length fw of the projection zoom lens system at the wide-angle end satisfy the following condition:

$$3 - fw12/fw.$$

7. A projection zoom lens system according to claim 1, wherein a length L of the projection zoom lens system and a focal length f2 of the second lens group satisfy the following condition:

$$1.4 < L/f2 < 1.8.$$

8. A projection zoom lens system according to claim 1, wherein a focal length f1 of the first lens group and a focal length f2 of the second lens group satisfy the following condition:

$$0.8 < |f1/f2| < 1.3.$$

9. A projector comprising the projection zoom lens system according to claim 1 and an image forming apparatus for supplying an image for projection to the incident side of the projection zoom lens system.

* * * * *

UNITED STATES PATENT AND TRADEMARK OFFICE
CERTIFICATE OF CORRECTION

PATENT NO.    : 6,587,279 B2
DATED         : July 1, 2003
INVENTOR(S)   : Shuji Narimatsu and Akira Sawamoto It is certified that error appears in the above-identified patent and that said Letters Patent is hereby corrected as shown below:

<u>Column 12,</u>
Line 40, change "3-$fw12/fw$" to -- 3<$fw12/fw$ --

Signed and Sealed this

Fourteenth Day of October, 2003

JAMES E. ROGAN
*Director of the United States Patent and Trademark Office*